(12) United States Patent
 Yang

(10) Patent No.: US 10,455,470 B2
(45) Date of Patent: Oct. 22, 2019

(54) METHODS FOR AUTOMATICALLY SWITCHING BETWEEN A MOBILE NETWORK AND A LOCAL AREA NETWORK

(71) Applicant: SHENZHEN ANTOP TECHNOLOGY LIMITED, Bao'An District, Shenzhen (CN)

(72) Inventor: Ruidian Yang, Shenzhen (CN)

(73) Assignee: SHENZHEN ANTOP TECHNOLOGY LIMITED, Shenzhen (CN)

( * ) Notice: Subject to any disclaimer, the term of this patent is extended or adjusted under 35 U.S.C. 154(b) by 58 days.

(21) Appl. No.: 15/218,820

(22) Filed: Jul. 25, 2016

(65) Prior Publication Data
US 2017/0111839 A1    Apr. 20, 2017

(30) Foreign Application Priority Data
Oct. 16, 2015 (CN) .......................... 2015 1 0677174

(51) Int. Cl.
 *G01R 31/08* (2006.01)
 *H04W 36/22* (2009.01)
 *H04W 28/02* (2009.01)
 *H04W 36/14* (2009.01)
 *H04W 84/04* (2009.01)
 *H04W 84/12* (2009.01)

(52) U.S. Cl.
 CPC ....... *H04W 36/22* (2013.01); *H04W 28/0278* (2013.01); *H04W 36/14* (2013.01); *H04W 84/042* (2013.01); *H04W 84/12* (2013.01)

(58) Field of Classification Search
 CPC ..... H04W 36/22; H04W 36/14; H04W 36/30; H04W 28/0278; H04W 84/042; H04W 48/16; H04W 48/18; H04W 60/00; H04W 36/00; H04W 72/10; H04L 45/028; H04L 12/189
 USPC ....................................................... 370/230
 See application file for complete search history.

(56) References Cited

U.S. PATENT DOCUMENTS

| | | | | |
|---|---|---|---|---|
| 7,146,130 B2 * | 12/2006 | Hsu | ........................ | H04L 12/189 455/3.04 |
| 9,030,987 B2 * | 5/2015 | Bianchetti | ........ | H04N 21/41422 370/312 |
| 9,226,306 B2 * | 12/2015 | Zhou | ..................... | H04W 72/10 |
| 9,414,301 B2 * | 8/2016 | Huang | .................. | H04W 48/16 |

(Continued)

Primary Examiner — Hanh N Nguyen
(74) Attorney, Agent, or Firm — Pearne & Gordon LLP

(57) ABSTRACT

A method for automatically switching between a mobile network and a local area network based on practical situations of both networks, whereby the switch does affect the online experience. For a switch from a mobile network to a local area network, wherein the network device is access to the mobile network, the switch is activated when data buffering meets requirements and a stable local area network signal is available, and then the network device is switched into the local area network. For a switch from a local area network to a mobile network, wherein the network device is access to the local area network, the switch is activated when data buffering meets requirements and the local area network is unstable, and then the network device is switched into the mobile network. The method ensures the watching experience of the user on the premise that the expenses are appropriately reduced.

11 Claims, 5 Drawing Sheets

(56) References Cited

U.S. PATENT DOCUMENTS 9,661,545 B2 * 5/2017 Yavuz .................. H04W 36/30
9,756,543 B2 * 9/2017 Nagaraj ................ H04W 36/30

* cited by examiner

METHODS FOR AUTOMATICALLY SWITCHING BETWEEN A MOBILE NETWORK AND A LOCAL AREA NETWORK

FIELD OF THE INVENTION

The present invention relates to network techniques and, in particular, to a method for automatically switching between a mobile network and a local area network.

BACKGROUND

Mobile networks such as 2G, 3G and 4G, and local area networks such as WLAN and WIFI are currently common techniques providing internet access for network terminal devices. Generally, network terminal devices, especially mobile internet devices such as mobile phones, notebook computer, and network access facilities on a moving vehicle, are provided with both mobile network and local area network access functions. A user can switch between different networks as needed, often manually. Networks' charges vary with mobile network significantly expensive than local area network. Therefore, network devices generally select local area networks as default when both networks are available and switch to a mobile network automatically when local area network is not available, in order to minimize costs. In this scenario, if a user needs to switch from a local area network to a mobile network when for example the signal of the local area network is too weak to use, the user has to disable the local area network access function. This is because the default setting of the network devices always enables it to switch into a local area network wherever a local area network is available.

The automatic switching setting built in current network devices, however, damages some of user experiences, although access fees are largely reduced. For example, a user definitely does not wish the media streams that are being played on the device, such as videos or audios, to be disrupted. However, due to current default settings in the network device, even when the local area network is so weak that it is not able to provide smooth playing, the device will not switch automatically to a faster mobile network. This often results in intermittent playing of the videos or audios, which negatively influences the joy of the user.

In this scenario, the network device will not switch into a mobile network until the signal of the local area network disappeared. Local area network signals are not evenly distributed, for example, when the network device is installed on a vehicle, or the signals are subject to wall separation, or a plurality of signals with various strengths coexists in same area. The uneven distribution causes the frequent switches between local area network and mobile network, which enhances power consumption and heat generation, despite of the fact that the expenses of mobile network access is reduced due to full use of local area networks.

The internet access through a local area network hinges on connection to a local area network device, such as a WIFI router, and then through the local area network device to a wide area network. However, the network device is not able to determine, by itself, whether the local area network device is connected to the wide area network. The network device will not be able to connect to the wide area network when the local area network is disconnected with the wide area network, although in this case it is shown that the network device is successfully connected to the local area network and even with a strong signal. Under the current default setting, the network device connects to the local area network all the time and does not automatically switch to a mobile network.

SUMMARY OF THE INVENTION

An object of the present invention is to provide a method for automatically switching between a mobile network and a local area network based on the practical situations of both networks, whereby the online experience is not affected due to the switch.

Specifically, provided is a method for automatically switching between a mobile network and a local area network which is particularly advantageous when playing medium streams such as videos or audios. The method reduces access expenses on the premise that the audios or videos are not interrupted.

In one embodiment, a method for automatically switching between a mobile network and a local area network is provided. The method is used for a network device to switch among different networks and comprises automatic switches from a mobile network to a local area network and from a local area network to a mobile network, in which:

for a switch from a mobile network to a local area network, wherein the network device is access to the mobile network, the switch is activated when data buffering meets requirements and a stable local area network signal is available, and then the network device is switched into the local area network; and for a switch from a local area network to a mobile network, wherein the network device is access to the local area network, the switch is activated when data buffering meets requirements and the local area network is unstable, and then the network device is switched into the mobile network.

By the present method, before the switch between networks, the network device undergoes data buffering. The network switch is activated only when the volume of the buffered data is enough to be used for the current operation for a period of time that the subsequent network switch takes. In this way, during the network switch, a user takes advantage of the buffered data for the current operation, for example watching videos or listening to audios, without noticing the network switching operation carried out by the network device. The user also does not notice when the network switch is failed and the network device resumes using previous network. The method is particularly advantageous when the network device is used for medium stream operations such as watching videos or listening to audios. The future network operations of the user are predictable, i.e., playing the medium stream files that follow in subsequent milliseconds or seconds, because medium stream is network data possessing time lines. The buffered data is the data to be used during this time period. During the network switch of the network device, the buffered data is used to play and the user will not experience a pause or frame skip, such that a good consumption experience is ensured. The network device can be any terminal devices able to play or provide medium stream, including for example cell phones, tablets, notebook computers, network players or TV boxes.

Among the network devices, the present method is particularly suitable for use with a moving network device, for example players or media centers installed on vehicles, which experience frequent network environment variations, especially local area network environment variation.

Generally, mobile networks feature wide distribution and higher stability but higher costs, such as 3G/4G techniques, and local area networks, such as WIFI network, are distributed within specific areas, have lower stability and cost less. Local area networks also confronts with complexity problems where more networks coexist in a particular area and security issues where the necessity of identity authentication should be determined. Also, as described in the Background, network devices preferentially use local area network to reduce costs. Network devices need to select a local area network that is suitable for current operations, taking into account the stability, complexity and safety aspects of local area networks; otherwise, it will carry out frequent switches between networks and causes significant power consumption. The method, when switching from a mobile network to a local area network, requires provision of stable local area network signals to start the switch, in addition to the requirement of data buffering.

As described above, due to lower access costs of local area network, network devices should connect to local area networks where possible to secure a reduced cost. The network devices switch from a local area network to a mobile network only when the local area network is not stable and can not allow for medium stream playing. Although mobile network costs higher, in order to ensure that there is no interruption or frame skips during video watching or audio listening, the network device needs to automatically switch to mobile network to guarantee smooth playing. In the present method, consumption experience is on the top priority of consideration, following by expenses factor, and further by energy consumption. Conventional techniques never consider consumption experiences and believe that the interruptions of medium stream are acceptable, which is contrary to the spirit of the present method.

In addition, due to the complexity of the network environment of a moving network device, the network device generally establishes a data buffering pool making use of the network currently used in order that switches among different networks can be carried out at any time. Therefore, a sufficient data buffering can be maintained and network switch can be performed whenever other requirements are met.

Based on the above, the switch from a mobile network to a local area network comprises steps of:
S10 the network device being access to the mobile network;
S20 determining whether the data buffer meets requirements;
S30 determining whether the local area network is stable and meets switching requirements; and
S40 switching the network device to the local area network.

The switch from a local area network to a mobile network comprises steps of:
S50 the network device being access to the local area network;
S60 determining whether the data buffer meets requirements;
S70 determining whether the signal of the local area network is too weak to continue operation; and
S80 switching the network device to a mobile network.

In steps S20 and S60, the determining is carried out to determine whether the data volume in the data buffer is enough to be used for the current operation for a period of time. In the situation of medium stream playing such as video or audio playing, the determining is carried out to determine whether the data volume in the data buffer is enough to be used for the playing operation for a period of time. The period of time at least lasts for a time period that the network switch takes, such that the user will not experience any interruption or frame skip of the video or audio playing in the process of the network switch. The data buffer may exist as a special area present on a memory or register, in order to perform pre-buffering to form a buffering pool, preparing for switching at any time. It is preferable to allocate the data buffer in a register in order to secure data buffering speed. However, the size of the register should be as small as possible such that a larger register space may be provided for other programs.

In step S70, if the signal of the local area network is able to meeting requirements of continuous operation, the switch is halted in order to save costs, and the method returns back to step S50, i.e., resuming access to the local area network.

In step S30, the network switch is halted when no stable and switching-satisfactory local area network is available and the network device continue to use the mobile network, i.e., back to step S10. The term "stable" is meant that a network has certain signal strength, and the network was previously connected and had been recognized by the network device as a connectable local area network. By "switching-satisfactory" it means the network should comply with requirements for considerations including security and identity authentication. Generally, a local area network that was previously connected meets the requirements. The considerations may be determined according to the specific safety requirements of the network device. As described above, when more than one local area networks present in a region, the present method does not search for the network with the greatest signal strength which is conventionally practiced. The present method preferentially connects to the local area network that was previously connected because the signal of which usually meets requirements of stability, security and identity authentication, such that the switching time period may be minimized. The shorter the time period is, the smaller the size of the data buffer needs. Therefore, the space occupied in the register is reduced.

Step S30 comprises steps of:
S31 determining whether a stable local area network signal is available;
S32 if yes, determining whether any of the local area network is available that was identity authenticated by the network device or has no requirements for identity authentication;
S33 if yes, selecting the local area network and proceeding to step S40.

The method selects, among stable local area network signals, a local area network that was previously connected, i.e., a network that was identity authenticated, or that has no requirements for identity authentication, for example local area networks with open access. A previously identity authenticated network or a local area network with open access can be automatically connected without identity authentication, which significantly reduces the time duration that the network switch lasts. Those types of networks are generally stored as a list of network identity in the network device. The method may directly proceed to step S40 to perform network switch as long as the network with stable network signal so found is in the list of network identity, such that the network switch takes place quickly. If the network identity is not in the list, the network list is cleared out and network switch stops. In this case, the use of the mobile network will be continued, i.e., the method proceeds to step S10.

In step S30, if no stable local area network signal exists, a search for stable local area network signal is performed within the area where the network device locates, and the search comprises steps of:

S35 if no local area network signal is present, determining the stability of the signal of the local area network, and determining the local area network is stable when the electrical level of the local area network is higher than a preset electrical level for a preset number of times.

As stated above, signal distribution of local area network is uneven, especially in the case of a moving network device where the signal strength of local area networks is dynamic. Conventionally, network switch takes place once strong signal strength of local area network is found which may cause frequent switches between two networks, leading to large amount of power consumption. Moreover, each switch takes a period of time and frequent switch may cause interruption of medium stream, leading to unsmooth playing. In contrast, the invented method determines whether the local area network signal is stable at first. As stated above, the preset number of times can be determined according to actual practice, generally ranging from 8 to 15. The determination may not be accurate if the number of times is less, and on the other hand, more times take longer. Most preferable number of times is 10. When the local area network is determined to be stable, identity is authenticated and the network is identified and stored in the list. Of course, no identification authentication is necessary for local area network with open access.

The method returns to step S10 in stead of direct network switch after stability determination. This is done because after step S35, the data in the data buffer may not be sufficient for maintaining smooth operation and step S20 needs to be performed again to determine the data buffer. Otherwise, the medium stream may be interrupted or frame skip occur, negatively affecting the watching experience.

Similarly, in step S70, the signal of the local area network is determined to be too weak to satisfy continuous operation if the electric level of the local area network signal is lower than the preset level for a preset number of times. The preset number of times can be determined as reference to that in step S35. Conventionally, when the signal of local area network is temporarily interrupted or too weak, network switch occurs, which may result in frequent switch. In the invented method, in the process of the determination, the network device can make use of the data buffered in the data buffer to continue playing without affecting the watching experience of the user and activates network switch only when the signal of the local area network is definitely interrupted or too weak, i.e., the electric level of the local area network signal is lower than the preset level for a preset number of times. In this case, contrary to those in step S35, because the local area network can not provide data flow for the data buffer, it is necessary to switch into a mobile network directly to ensure the continuous playing of the medium stream.

As stated above, the size of the data buffer should be reasonably controlled. Step S20 or S60 determines whether the volume of the data buffer is full and determines meeting requirements if it is full. In particular, in the circumstance where the network device is used to playing video through a network where larger amount of data flow is needed, the user will not feel frame skip or screen flashing when the data flow is more than 20 frames/second, in view that the minimum resolution of human eyes is 20 frames/second. Considering the sharpness of video playing and data transferring speed, the volume of the data buffer is set to be 2 to 6 megabytes ("M"), and preferably 4M.

When the determination made in step S20 or S60 is positive to switch, while the switching requirements are not finally met, the method should re-start from step S20 or S60. This is done because once the switch is initiated, the video data stored in the data buffer was be used for playing. If it is finally determined that the switching requirements are not met, for example when any of steps S30/S31/S32/S35/S70 is negative, the switch should be halted. In the next cycle, the method starts from step S20 or S60 to determine whether enough data volume is stored in the data buffer.

The present method is particularly suitable for a mobile network device with video playing. It enables the moving device to switch between a mobile network and a local area network according to the actual network conditions where it is located, for the purpose of reducing expenses. In the process of switching, first of all, the video playing should not be affected, i.e., the smooth playing of the video is ensured. Secondly, the number of switching times is reduced to the maximum in order to decrease power consumption. Lastly, the expenses are reduced.

The hierarchical design of the present method ensures the watching experience of the video, which is particularly suitable for vehicles such as motor home, yacht or touring bus where the smooth playing of the video is the most important concern and the expenses are not the focus. The present method differs from the conventional methods mainly in that it ensures the watching experience of the user on the premise that the expenses are appropriately reduced. The invented method represents a technique direction completely different from conventional switching methods. The present method possess substantial features and significant progress in the filed of network video playing compared with conventional techniques.

DETAILED DESCRIPTION OF THE INVENTION

EXAMPLE 1

The present invention is further exemplified in reference to the drawings. The present example illustrates a mobile video playing terminal device, such as mobile phones, notebook computer, tablet computer and etc. The mobile device uses 4G and WIFI in alternation to download video data. The present example switch from 4G to WIFI when a WIFI signal meeting requirements is available and from WIFI to 4G when the WIFI signal is too weak to satisfy playing requirements.

Figure 1:
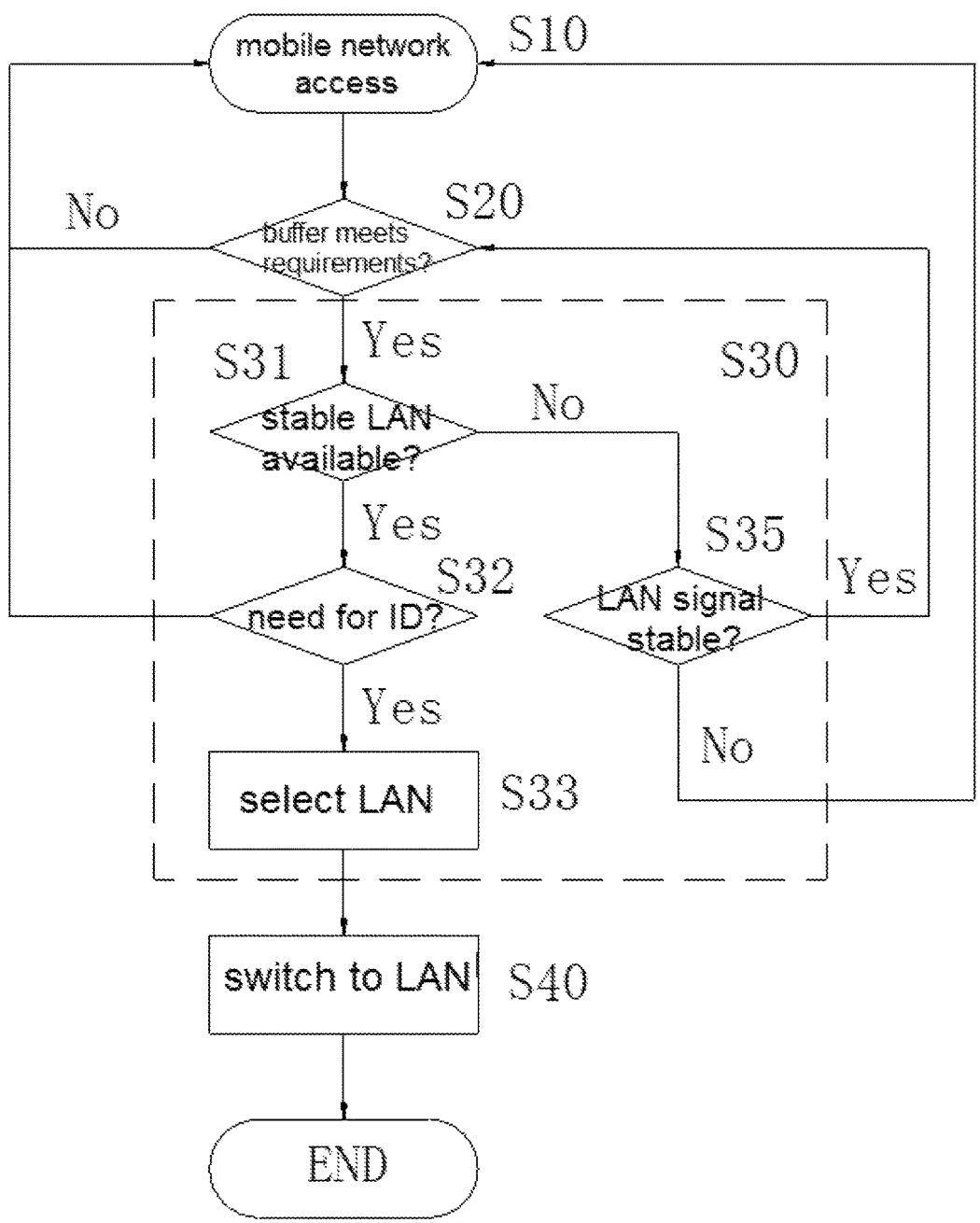
FIG. 1 is a flow chart showing the process of switching from 4G to WIFI as illustrated in Example 1 of the invention.

For a switch from a mobile network to a local area network, wherein the network device is access to the mobile network, the switch is activated when data buffering meets requirements and a stable local area network signal is available, and then the network device is switched into the local area network. FIG. 1 shows the steps carrying out the method.

S10. The network terminal device is access to a mobile network, such as 3G/4G, or next generation mobile communication network. Mobile network features wide and stable signal distribution, but higher costs.

S20. Data buffer is determined as to whether operation requirement is met. Network device downloads video data to a data buffer through the mobile network when it is access to the mobile network. In this example, the size of the data buffer is 4M. The data transferring speed under 4G network is 300M. The time that is needed to achieve insensible delay or frame skip by human eyes is therefore 1000000US/300=3.3uS. Accordingly, the determination regarding switch from one network to another depends on the time duration, with each switch not lasting over 3.3uS. The MCU may adopt DMA parallel processing in the process of execution. If the data buffer is less than 4M, the switch will be halted and the mobile network is continue to be used for data buffering.

S30. The local area network signal is determined as to whether it is stable and meets switching requirements, comprising steps as shown in the dashed boxes.

S31. Determining whether a stable local area network signal exists, such as WIFI signal. The presence of stable local area network signal is key to decide whether the network switch should be performed, because otherwise in the event that the network device is moving where the local area network signals are changing all the time, the network device may experience frequent switch between a mobile network and a local area network, consuming large amount of power and causing unsmooth video playing, as immediate switch is initiated once a local area network signal is found as conventionally practiced.

S32. If a stable local area network signal exists, a further step is performed to determine whether a local area network exists that was identity authenticated or of which no identity authentication is needed. If a stable local area network signal exists, it is necessary to determine whether the signal is directly accessible.

S33. If a local area network signal that was previously identity authenticated or no identity authentication is necessary, then such a network is selected and the method proceeds to step S40 and switch the network to the local area network. In this process, the network identity of the local area network signal that was previously connected or requires no identity authentication is recorded. A network identity list therefore may be generated in the network device, in which the networks are available for direct switch. As long as the network so found is in the identity list, the method can directly proceed to step S40 and switch from the mobile network to a local area network, i.e., from 4G to WIFI. If the network so found is not in the list, indicating that identity authentication is needed for the network, a manual identity authentication procedure needs to be taken. The network identity so identified should be cleared if the identity authentication fails. As stated above, the process taking place so far has consumed a period of time and step S20 needs to be performed to ensure that the video playing is not affected.

Figure 2:
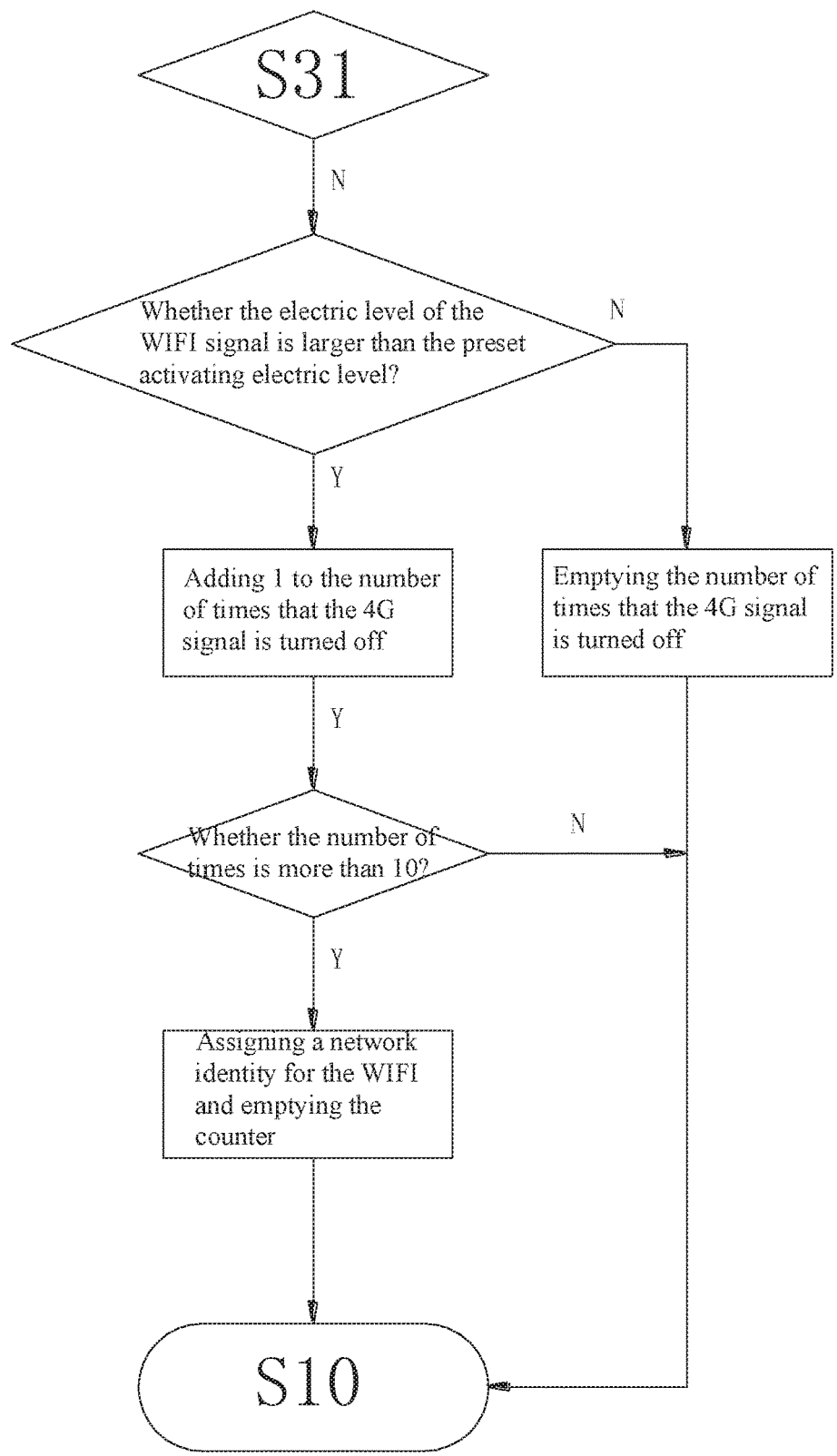
FIG. 2 shows a flow chart illustrating the process of searching stable WIFI signal in Example 1.

In the step S31, if no satisfactory local area network signal is available, the method will proceed to step S35 to determine the stability of the local area network signal. If the electric level of the local area network signal is higher than the preset electric level for a preset number of times, the local area network signal is determined to be stable. As shown in FIGS. 1 and 2, first of all, the method determines whether the electric level of the found local area network signal is higher than the preset activating electric level. The network device is provided with a counter which adds 1 to the number of times the 4G network is turned off when the electric level of the local area network signal is higher than the preset activating electric level. In the present example, when the number of times the 4G network is turned off reaches 10, the counter is emptied and the WIFI signal is recorded, i.e., a WIFI network identity is assigned to the local area network signal and added to the list as stated above. In this process, once the electric level of the local area network is less that the preset activating electric level, the switch will be halted and counter will be emptied. Because the process has consumed a period of time, step S20 needs to be performed to ensure that the video playing is not affected.

Figure 3:
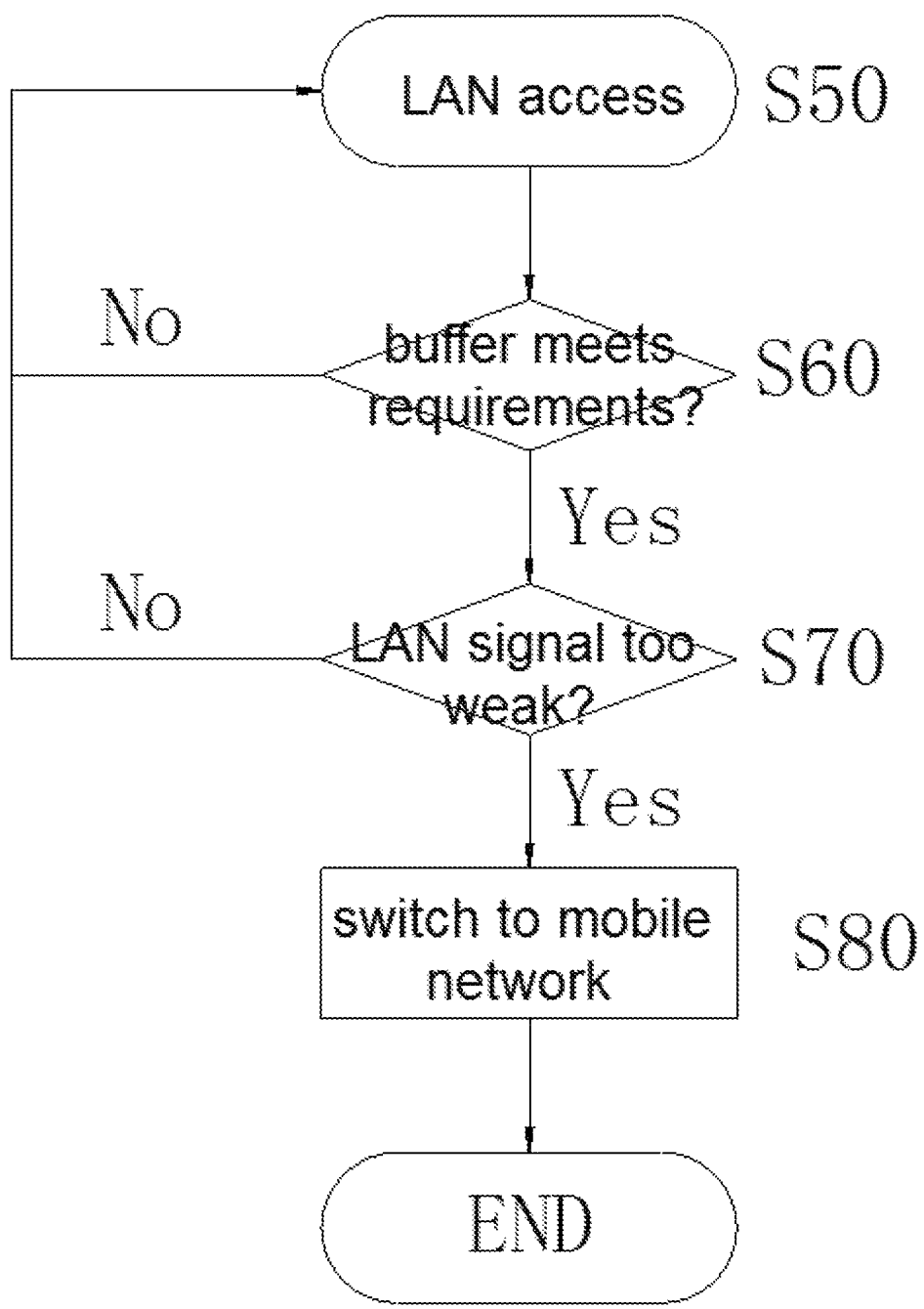
FIG. 3 shows a flow chart showing the process of switching from WIFI to 4G as illustrated in Example 1.

For a switch from a local area network to a mobile network, wherein the network device is access to the local area network, the switch is activated when data buffering meets requirements and the local area network is unstable, and then the network device is switched into the mobile network, i.e., from WIFI to 4G, which is illustrated in FIG. 3.

S50. The network device uses a local area network, such as various WIFI signals or next generation local area networks. Local area networks features lower costs, more options, but lower stability.

S60. The method determines whether the data buffer meets operation requirements. As stated in the step S20, the network device downloads video data to the data buffer through the mobile network and the size of the buffering area is set also as 4M in the present example.

S70. The method determines whether the signal of the local area network is too weak to meet the requirements of continuous operation. As stated above, the network switch should be performed only when the signal of the local area network is too weak to meets the requirements of continuous video playing in order to use the local area network as far as possible for the purpose of expense reduction.

The signal of local area network is dynamic and if immediate switch is performed once the local area network signal is too weak as conventionally performed, the network device will experience frequent and repeated network switches between a mobile network and a local area network, consuming large amount of power and causing unstable video playing.

Figure 4:
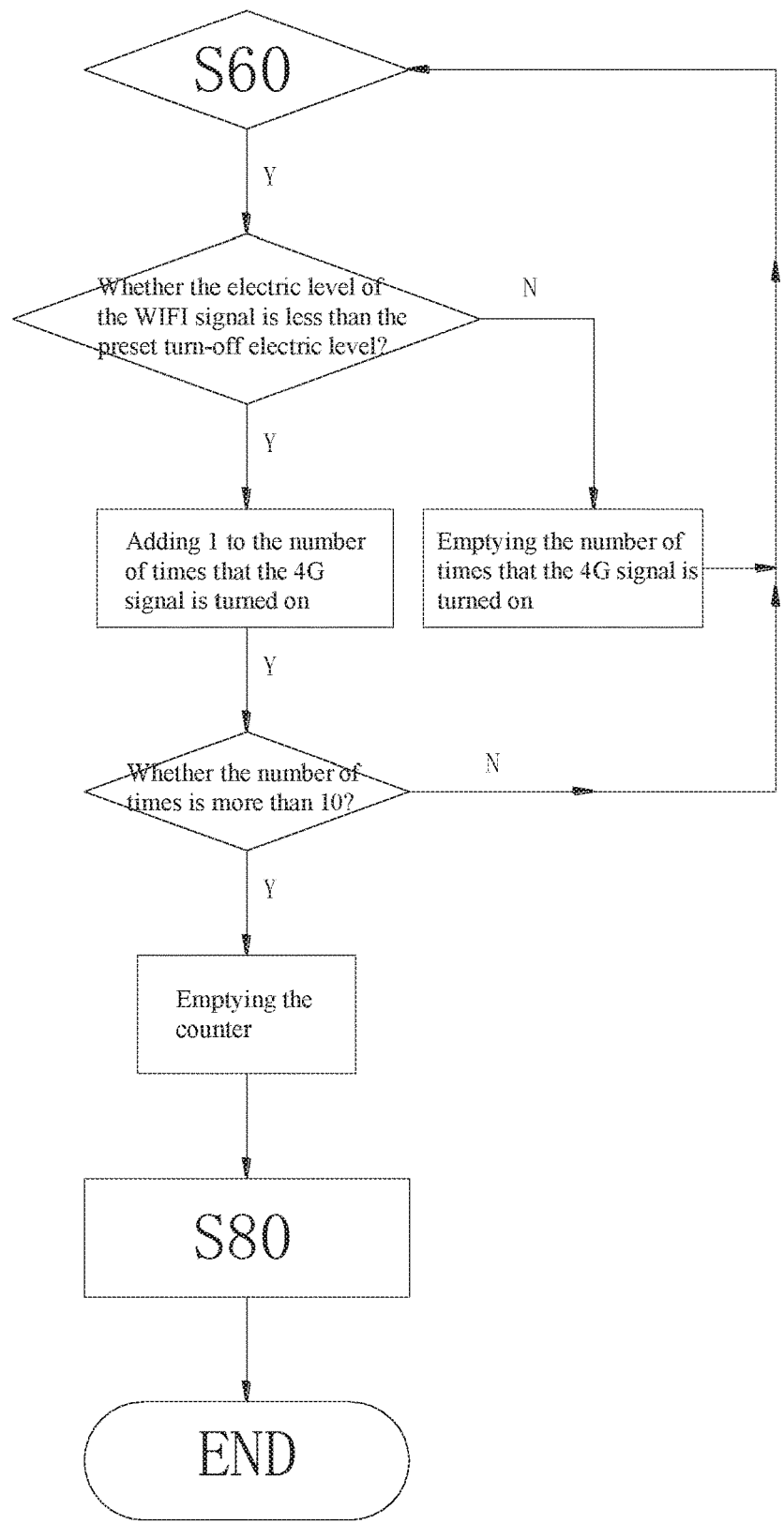
FIG. 4 is a flow chart illustrating the process of determination of whether the WIFI signal is problematic.

Therefore, step S70 determines the signal of the local area network is too weak to operate when the electric level of the signal of the local area network is lower than the preset electric level for a preset number of times. As shown in FIG. 4, first of all, the method determines whether the electric level of the signal of the current local area network is lower than the preset turn-off electric level. The network device is provided with a counter which adds 1 to the number of times the 4G network is turned on when the electric level of the local area network signal is less than the preset turn-off electric level. In the present example, when the number of times the 4G network is turned on reaches 10, the WIFI network will be determined as not meeting the requirements of continuous playing and the counter is emptied. The method then proceeds to step S80 and switch the network to a mobile network, i.e., from WIFI to 4G. In this process, once the electric level of the signal of the local area network is more than the preset turn-off electric level, the WIFI signal is determined to be satisfactory for video playing and the switch is halted and the counter emptied. Because the process has consumed a period of time, step S60 needs to be performed to ensure that the video playing is not affected.

EXAMPLE 2

The present example relates to a video playing relay, such as a network router, TV box or video player, installed on a vehicle. The network device is moving along with the vehicle, for example a network router or video player installed on a motor home or a yacht. The network device has a very complicated network environment and downloads video data by 4G and WIFI in alternation. The present example switches from 4G to WIFI when the WIFI signal meets requirements and from WIFI to 4G when the WIFI signal is too weak to meet playing requirements.

Figure 5:
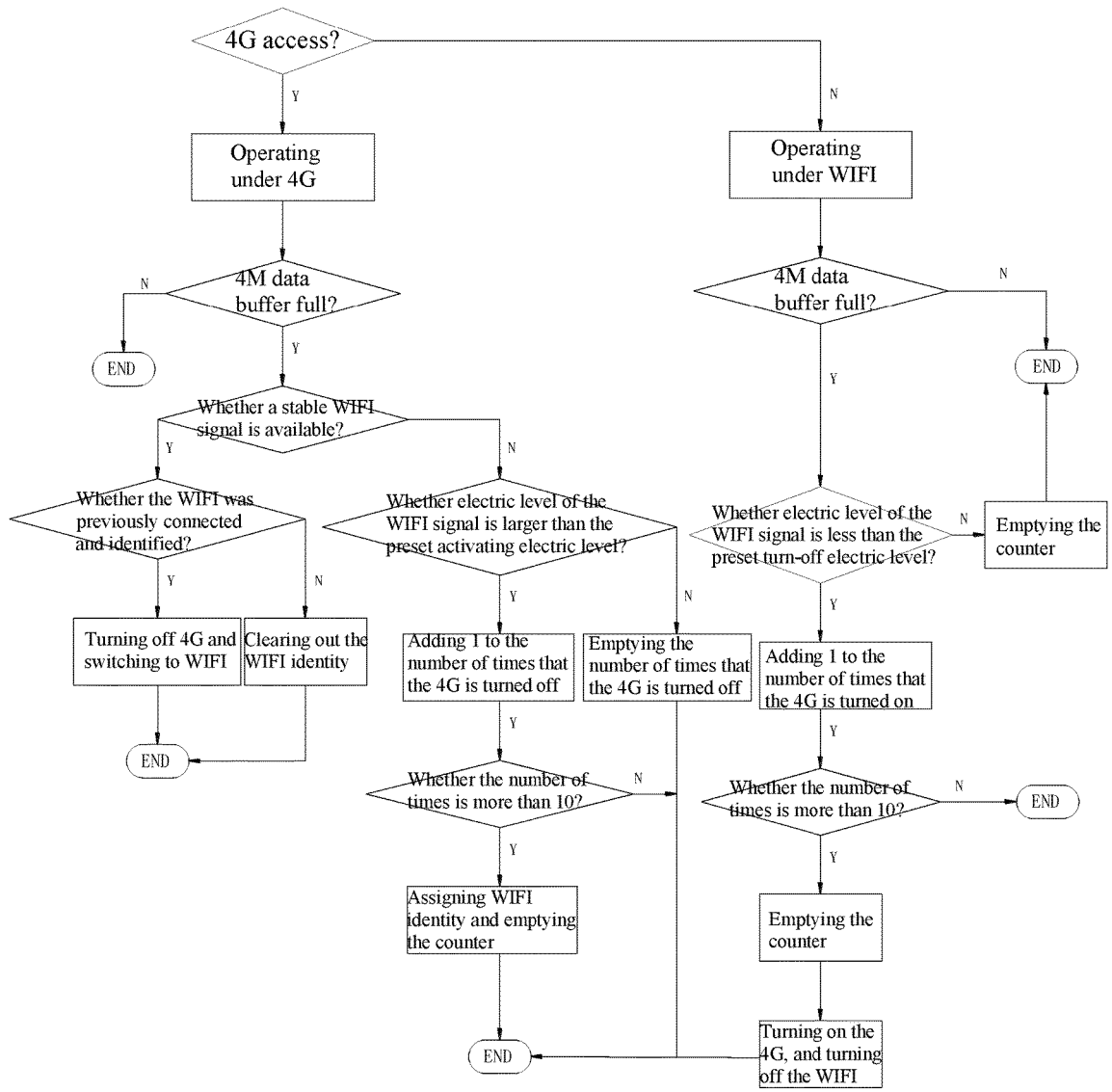
FIG. 5 is a flow chart illustrating the process of Example 2 of the invention.

As shown in FIG. 5, in the process of network switch, the network router firstly determines whether the network currently in access is 4G network, and if yes, activates the switch from 4G to WIFI; if not, activate the switch from WIFI to 4G.

The network router downloads video data to the data buffer by the 4G network. In the present example, the size of the data buffer is 4M. The data transferring speed under 4G network is 300M. The time that is needed to achieve insensible delay or frame skip by human eyes is therefore 1000000US/300=3.3 uS. Accordingly, the determination regarding switch from one network to another depends on the time duration, with each switch not lasting over 3.3 uS. The MCU may adopt DMA parallel processing in the process of execution. If the data suffer is less than 4M, the switch will be halted and the mobile network is continue to be used for data buffering.

It follows the determination of whether a stable WIFI signal is present in the area. The 4G port of the network will be turned off and the network is switched to WIFI network when a stable WIFI signal is found, which was already identified and previously connected. If the WIFI was not identified, the identity of the WIFI network will be cleared out and the switch halted.

If no WIFI network signal that meets requirements is available, the method proceeds to the step of determining the stability of the WIFI network signal. The method firstly determines whether the electric level of the signal of the WIFI network is higher than the preset activating electric level. If positive, the counter which adds 1 to the number of times the 4G network is turned off. In the present example, when the number of times the 4G network is turned off reaches 10, the WIFI network will be assigned with a network identity. The counter will be emptied and the switch halted. In this process, the switch will be halted once the electric level of the WIFI signal is less than the preset activating electric level. Then the number of times that the 4G mobile network is turned off is emptied.

The network router downloads video data to the data buffer through WIFI network when it is connected with the WIFI network. In the present example, the size of the data buffer is also 4M. If the data buffer is not full, switch will be halted and the mobile network will be used for data buffering.

The method then determines whether the electric level of the current WIFI signal is less than the preset turn-off electric level. If positive, the counter adds 1 to the number of the times that the 4G mobile network is turned on. When the number of times the 4G network is turned on reaches 10, the counter will be emptied and the 4G mobile network is turned on. The WIFI network will be turned off, and the network switch is completed.

In this process, the switch will be halted once the electric level of the WIFI signal is more than the preset turn-off electric level, indicating that the WIFI signal is sufficient to meet video playing requirements. Then the counter is emptied and the switch is halted.

The logical relationship in the drawings is provided for illustrative purpose only and should not be limiting. It is apparent that the examples set forth herein are provided for clearly describing the technical solutions only without limitation to the scope of the claims. Various changes or alternation can be made based on the examples by the skilled persons in the art. The examples are no need to be and can not be exhaustive. Any changes, equivalent alternatives or improvements falling into the spirit or principle of the invention should be considered as within the scope of the claims.

The invention claimed is:

1. A method for automatically switching of a network device from a mobile network to a local area network and from a local area network to a mobile network, the method comprising:
   determining whether a volume of a data buffer of the network device is sufficient to perform an operation for a period of time, wherein the volume of the data buffer of the network device is sufficient to perform the operation for the period of time when the volume of the data buffer is full, wherein the data buffer is full when the volume of the data buffer is between 2M and 6M;
   switching from the mobile network to the local area network, when the network device is connected to the mobile network, when a stable local area network signal is available, and when the volume of the data buffer is full; and
   switching from the local area network to the mobile network, when the network device is connected to the local area network, when the volume of the data buffer is full, and when the local area network is unstable.

2. The method according to claim 1, wherein the switching from the mobile network to the local area network comprises steps of:
   connecting the network device to the mobile network;
   determining whether the local area network is stable and meets switching requirements; and
   switching the network device to the local area network.

3. The method according to claim 2, wherein the step of determining whether the local area network is stable and meets the switching requirements comprises steps of:
   determining whether a stable local area network signal is available;
   when the stable local area network signal is available, determining whether any of the local area network is available that was identity authenticated or has no requirements for identity authentication; and
   when any of the local area network is available that was identity authenticated or has no requirements for identity authentication, selecting the local area network and switching the network device to the local area network.

4. The method according to claim 3, wherein the step of determining whether the local area network is stable and meets the switching requirements further comprises a step of:
   when no local area network signal is present, determining a stability of the signal of the local area network, and determining the local area network is stable when an electrical level of the local area network is higher than a preset electrical level for a preset number of times.

5. The method according to claim 2, wherein the switching from the local area network to the mobile network comprises steps of:
   connecting the network device to the local area network;
   determining whether the signal of the local area network is too weak to continue operation; and
   switching the network device to the mobile network.

6. The method according to claim 5, wherein in the step of determining whether the signal of the local area network is too weak to continue operation, the signal of the local area network is determined to be too weak to satisfy continuous operation when an electric level of the local area network signal is lower than a preset level for a preset number of times.

7. The method according to claim 5, wherein the method restarts from the step of determining whether the volume of the data buffer is full when the switching requirements are not met.

8. The method according to claim 1, wherein the volume of the data buffer is 4M.

9. The method according to claim 1, wherein the period of time is a time necessary for the switching between the mobile network and the local area network.

10. The method according to claim 1, wherein the operation performed by the network device is medium stream playing of video or audio.

11. The method according to claim 10, wherein when the volume of the data buffer is full, the medium stream playing of video or audio is not interrupted during the switching from the mobile network to the local area network or during the switching from the local area network to the mobile network.

* * * * *